July 26, 1949.  A. G. SMITH  2,477,497
DIRIGIBLE HEADLIGHT MECHANISM FOR AUTOMOBILES
Filed Feb. 17, 1947  3 Sheets-Sheet 2
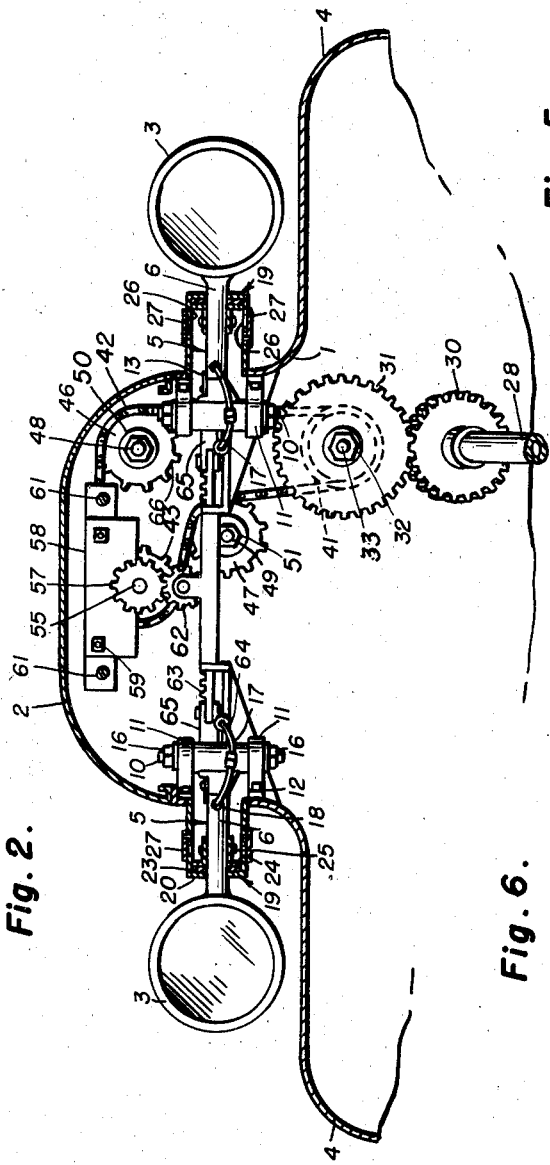
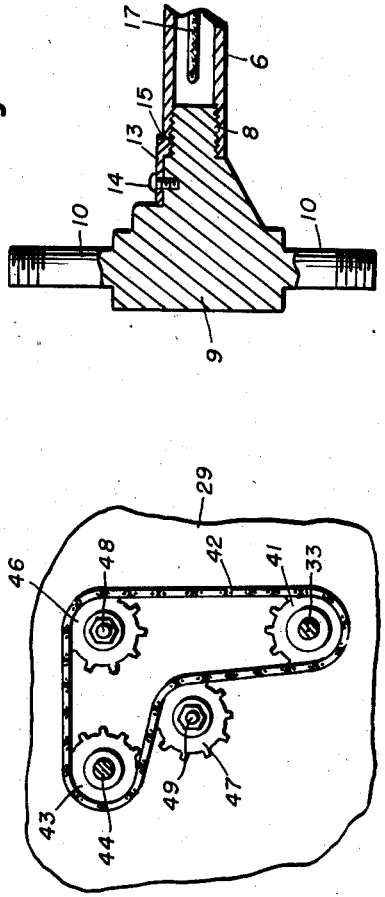
Inventor
Andrew G. Smith
By *Clarence A. O'Brien and Harvey B. Jacobson*
Attorneys July 26, 1949.  A. G. SMITH  2,477,497
DIRIGIBLE HEADLIGHT MECHANISM FOR AUTOMOBILES
Filed Feb. 17, 1947  3 Sheets-Sheet 3

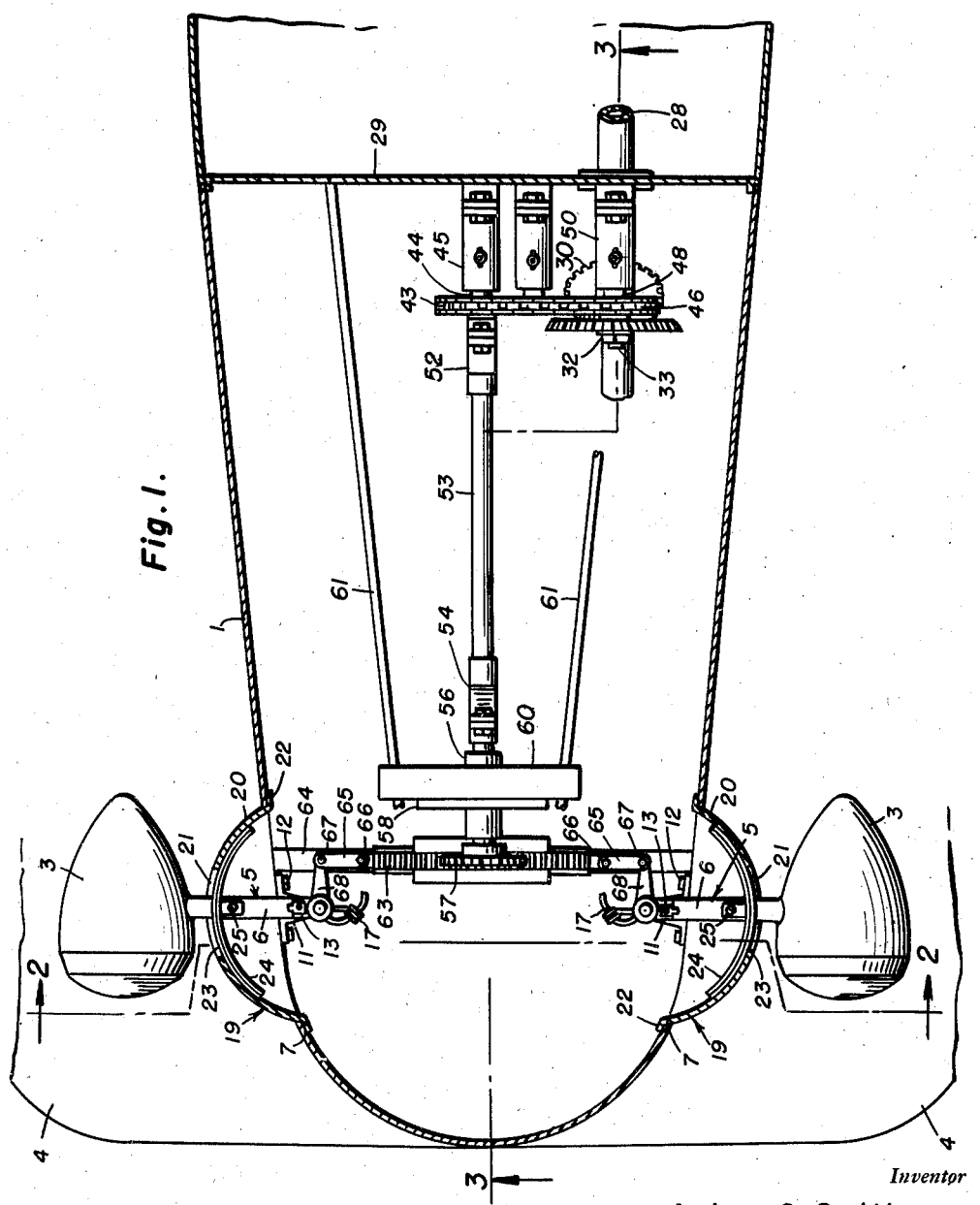

Inventor
Andrew G. Smith
By *Clarence A. O'Brien and Harvey B. Jacobson*
Attorneys Patented July 26, 1949

2,477,497

UNITED STATES PATENT OFFICE 2,477,497

DIRIGIBLE HEADLIGHT MECHANISM FOR AUTOMOBILES

Andrew G. Smith, Detroit, Mich.

Application February 17, 1947, Serial No. 729,120

3 Claims. (Cl. 240—62.51)

My invention relates to improvements in dirigible headlight mechanisms, for automobiles, and the like.

The primary object of my invention is to provide for operating automobile headlights through the steering post of an automobile to direct the beams from the headlights so as to illuminate the road, when the automobile is turning, in a more efficient way than has heretofore been possible with present-day steering post operated headlights.

Another object is to accomplish the above by means of simply constructed headlight mechanism imposing a minimum of strain on the steering post and which is easily operated thereby, will not get out of order, and is adapted for installation in present-day automobiles, without prohibitively increasing the cost thereof.

Other and subordinate objects, also comprehended by my invention, together with the precise nature of my improvements, and the advantages thereof, will be readily understood when the succeeding description and claims are read with reference to the drawings, accompanying and forming part of this specification.

In said drawings:

Figure 1 is a view in horizontal section taken through the hood of an automobile and showing my improved dirigible headlight mechanism in plan;

Figure 2 is a view in transverse section taken on the line 2—2 of Figure 1;

Figure 5 is a detail view in vertical section of one of the knee joint members.

Figure 6 is a fragmentary view in front elevation of the sprocket and chain connection of the operating mechanism for swinging the knee joints.

Figure 3:
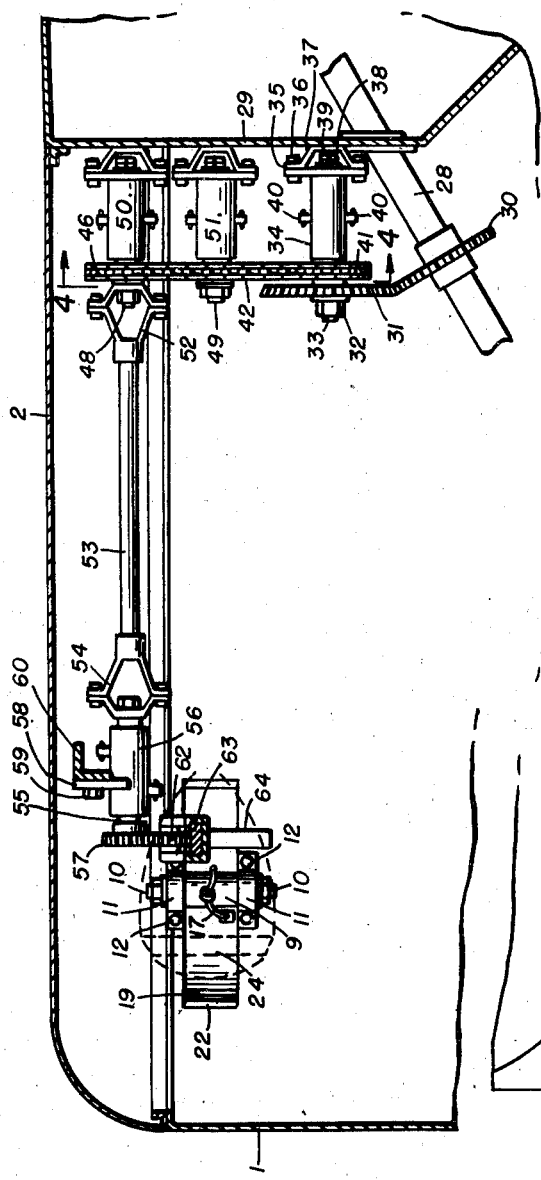
Figure 3 is a view in vertical longitudinal section taken on the line 3—3 of Figure 1.
Figure 4:
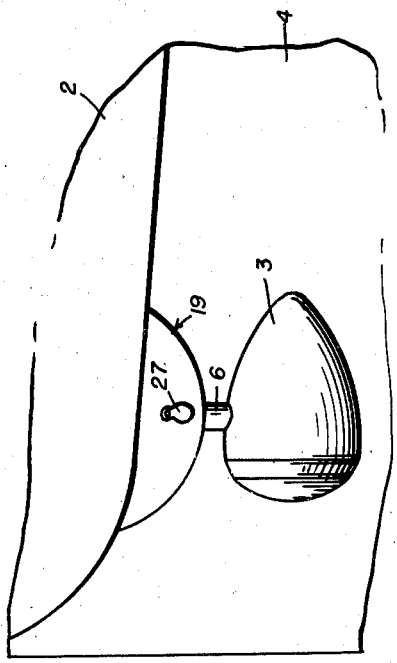
Figure 4 is a fragmentary view in plan illustrating one of the turrets and headlights.

Referring now to the drawings by numerals, according to my invention, in the preferred embodiment illustrated, the hood 1 of an automobile is provided, at a suitable location adjacent the front end thereof, and below the hood cover 2, with a pair of the usual headlights 3 at opposite sides thereof swingable horizontally, forwardly and rearwardly, over the fenders 4 on mountings 5.

The mountings 5 for the headlights 3 comprise horizontal side arms 6 on the headlights 3 extending into the hood 1 through suitable openings 7 in the opposite sides of said hood. The side arms 6 are preferably tubular and threaded at inner ends thereof, as at 8, onto a pair of knee joint members 9. The knee joint members 9 comprise, respectively, a pair of vertically aligned studs 10. The pairs of studs 10 are journaled in pairs of upper and lower bearing brackets 11 in the hood 1 bolted, as at 12, to the inner sides of the hood at the top and bottom of the openings 7. A pair of keeper plates 13 are secured by screws 14 to said knee joint members 9 and recessed into the side arms 6, as at 15, said keeper plates releasably locking the side arms 6 against working loose on said knee joint members 9. Nuts 16 secure the studs 10 in the bearing brackets 11. The usual electric leads 17 for the headlights 3 extend into the side arms 6 through openings 18 in said arms. As will be seen, the described mountings 5 provide for horizontal swinging of the headlights 3 about vertical axes, provided by knee joints inside the hood 1 and protected thereby.

A pair of turrets 19, at opposite sides of the hood 1, cover the openings 7 with horizontally arcuate outer sides 20 concentric to the axes of swinging movement of the side arms 6 and through which the side arms 6 extend and play in longitudinal slots 21 in said walls 20. The turrets 19 may be secured in any suitable manner to the sides of the hood 1, for instance, by having edges, as at 22, fitting in said openings 7 and secured in place by welding, not shown. For sealing the slots 21 in the side walls 20, to prevent water and dust from entering the same, arcuate liner bands 23, of suitable material, are provided on the side arms 6 to slide along the sides 20 of said turrets 19 when said side arms 6 are swung, and which are held against said sides 20 by arcuate backing plates 24 secured to said side arms 6 by screws, as at 25. Openings 26 in the tops and bottoms of the turrets 19, with pivoted cover flaps 27, provide for access to the screws 25 should occasion require.

Operating mechanism for swinging the knee joint members 9 simultaneously, and hence the side arms 6 and headlights 3 is provided as follows.

The steering post 28 of the automobile has fixed thereon in front of the dashboard 29 a gear 30 meshing with a bevel gear 31, directly above the gear 30, and secured by means of a nut 32 on the front of a horizontal spindle 33 journaled in a sleeve bearing 34 extending forwardly from the dashboard 29 in vertical alignment with said post 28 and secured to said board 29 by a rear end flange 35 thereon bolted, as at 36, to a channel bracket 37 secured, as by welding, not shown, to said board 29. The bracket 37 provides a space between the same and the flange 35 for access to spindle adjusting nuts 38 with cotter pins 39 extending therethrough, and which need merely be mentioned in passing. Grease gun fittings 40 on the bearing 34 provide for lubricating the same. A sprocket wheel 41 is fixed on the spindle 33 alongside the bevel gear 31.

A sprocket chain 42 operatively connects the sprocket wheel 41 with a similar sprocket wheel 43 fast on the front end of a horizontal spindle 44, similar to the spindle 33, and journaled in a bearing 45 constructed and arranged like the bearing 34, but, disposed in the vertical center of the dashboard 29 above the level of the mountings 5.

Suitable idler sprocket wheels 46, 47 over which the sprocket chain 42 is trained, are provided on spindles 48, 49 journaled in bearings 50, 51, similar to the described bearings 34, 45, and similarly secured to the dashboard 29. The spindle 44 is operatively connected by a suitable coupling, as at 52, to the rear end of a horizontal motion transmitting shaft 53 extending forwardly from the spindle 44 in alignment therewith and similarly coupled at its front end, as at 54, to the rear end of a horizontal spindle 55 journaled in a bearing 56 similar to the bearings 34, 45, 50, 51, said spindle 55 having suitably fixed on the front end thereof a gear pinion 57. The bearing 56 is suitably fixed to a hanger plate 58 bolted, as at 59, to an angle bar 60 suitably fixed on the usual horizontal brace rods 61 of the radiator, not shown.

The gear pinion 57 meshes with a subjacent reversing gear pinion 62 meshing with a rack bar 63 endwise slidable in a guide bracket 64 extending transversely of the hood and on which the reversing gear pinion 62 is suitably mounted. The rack bar 63 is operatively connected at the ends thereof to the knee joint members 9 by a pair of laterally swingable compensating links 65 pivoted to said bar, as at 66, and, as at 67, to a pair of crank arms 68 on said knee joint members 9.

The manner in which the described invention operates will be readily understood. Turning of the steering post 28 for steering to the right or left results in horizontal swinging of the headlights 3 so as to direct the axis of the beams to the right, or left, in correspondence with the direction in which the automobile turns. The gear pinion 57 is driven in the opposite direction from that in which the steering post 28 is turned, through the medium of the gears 30, 31, sprocket chain 42, sprocket wheels 41, 57, shaft 53 and spindle 55, but, because of the reverse gear pinion 62, the rack bar 63 is moved in the same direction as that in which the steering post 28 is turned to thereby swing the headlights 3 in the proper direction to direct the beams on the road and in the direction of turning of the automobile.

As will be seen, the described invention in no way interferes with raising or lowering of the hood cover 2 and all parts of the mechanism are accessible when the hood 2 is raised.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

What I claim is:

1. The combination with the hood and steering post of an automobile, of a pair of slotted turrets on opposite sides of said hood, a pair of headlights, side arms on said headlights extending through the slots in the turrets and pivotally mounted in said hood to swing horizontally and correspondingly swing said headlights, means for operatively connecting said steering post to said side arms to swing the same in unison by turning of said post, and means for sealing the slots in said turrets during swinging of said side arms.

2. The combination with the hood and steering post of an automobile, of a pair of headlights at opposite sides of said hood, a pair of side arms supporting said headlights, said arms extending into said hood and being pivotally mounted therein for horizontal swinging forwardly and rearwardly, and means operative by turning of said steering post to swing said arms simultaneously comprising a rack bar slidably mounted in said hood for endwise movement transversely of the hood, operating connections between the ends of said rack bar and said arms, and operating connections between said steering post and rack bar.

3. The combination with the hood and steering post of an automobile, of a pair of headlights at opposite sides of said hood, a pair of side arms supporting said headlights, said arms extending into said hood and being pivotally mounted therein for horizontal swinging forwardly and rearwardly, and means operative by turning of said steering post to swing said arms simultaneously comprising a rack bar slidably mounted in said hood for endwise movement transversely of the hood, operating connections between the ends of said rack bar and said arms, and operating connections between said steering post and rack bar, the pivotal mountings for said side arms comprising knee joints, and the operating connections between said end of said rack bar and said arms comprising cranks on said knee joints and compensating links pivoted to said ends of the rack bar and to said cranks.

ANDREW G. SMITH.

REFERENCES CITED

The following references are of record in the file of this patent:

UNITED STATES PATENTS

| Number | Name | Date |
|---|---|---|
| 1,200,279 | Walton et al. | Oct. 3, 1916 |
| 1,882,415 | Freeberg | Oct. 11, 1932 |
| 2,142,457 | Robbins | Jan. 3, 1939 |